US012621299B1

(12) United States Patent
Kartoun et al.

(10) Patent No.: US 12,621,299 B1
(45) Date of Patent: May 5, 2026

(54) LINGUISTIC PROFICIENCY BASED PROTOCOLS

(71) Applicant: International Business Machines Corporation, Armonk, NY (US)

(72) Inventors: Uri Kartoun, Cambridge, MA (US); Sophie Batchelder, Cambridge, MA (US); Hamid Majdabadi, Ottawa (CA); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 18/903,018

(22) Filed: Oct. 1, 2024

(51) Int. Cl.
| | |
|---|---|
| *H04L 29/06* | (2006.01) |
| *G06F 40/40* | (2020.01) |
| *H04L 9/40* | (2022.01) |

(52) U.S. Cl.
CPC .............. *H04L 63/10* (2013.01); *G06F 40/40* (2020.01)

(58) Field of Classification Search
CPC ................................. H04L 63/10; G06F 40/40
See application file for complete search history.

(56) References Cited

U.S. PATENT DOCUMENTS

| | | | |
|---|---|---|---|
| 8,155,948 | B2 | 4/2012 | Ruano et al. |
| 9,129,591 | B2 | 9/2015 | Sung et al. |
| 9,794,399 | B1 | 10/2017 | Hodge |
| 11,017,766 | B2 | 5/2021 | Chao et al. |
| 11,108,764 | B2 | 8/2021 | Alexander et al. |
| 11,568,139 | B2 | 1/2023 | Kogan et al. |
| 12,032,672 | B2 * | 7/2024 | Qin .......................... G06F 21/36 |
| 2001/0016040 | A1 * | 8/2001 | Imura .................... H04M 1/724 |
| | | | 379/354 |
| 2009/0024050 | A1 * | 1/2009 | Jung ..................... A61B 5/4064 |
| | | | 600/544 |
| 2012/0084450 | A1 * | 4/2012 | Nagamati ............... G06F 21/31 |
| | | | 709/229 |
| 2013/0179958 | A1 * | 7/2013 | Fujiwara ................ G01C 17/02 |
| | | | 726/7 |
| 2015/0172276 | A1 * | 6/2015 | Guiney ................... G06F 21/36 |
| | | | 726/7 |
| 2015/0294206 | A1 * | 10/2015 | Fujimoto ................. B41J 29/42 |
| | | | 358/1.14 |
| 2015/0381376 | A1 * | 12/2015 | Wardman ............ H04L 63/0861 |
| | | | 726/25 |
| 2016/0034305 | A1 * | 2/2016 | Shear ........................ G06F 9/50 |
| | | | 707/722 |
| 2017/0083507 | A1 * | 3/2017 | Ho ........................... G06F 40/20 |
| 2020/0134013 | A1 | 4/2020 | Pasternack |
| 2021/0406849 | A1 | 12/2021 | Noë et al. |
| 2023/0043457 | A1 * | 2/2023 | Khan ...................... G06F 40/40 |

(Continued)

OTHER PUBLICATIONS

Author unknown, "Configuring CAPTCHA," IBM API Connect, Jun. 25, 2024, 2 pages, ibm.com, accessed Aug. 21, 2024, https://www.ibm.com/docs/en/api-connect/saas?topic=security-configuring-captcha.

(Continued)

*Primary Examiner* — Mahfuzur Rahman
(74) *Attorney, Agent, or Firm* — Yee & Associates, P.C.

(57) ABSTRACT

A method for accessing a resource. A set of language affinities for multiple languages is identified in response to receiving a request from a client device for a user to access the resource. The user is authenticated using the set of language affinities for the multiple languages.

20 Claims, 9 Drawing Sheets

(56) References Cited

U.S. PATENT DOCUMENTS

| | | | | |
|---|---|---|---|---|
| 2023/0067897 | A1* | 3/2023 | Kang | H04L 63/1483 |
| 2024/0273793 | A1* | 8/2024 | DeCharms | G06F 40/109 |
| 2024/0361827 | A1* | 10/2024 | McNulty | G10L 25/63 |
| 2024/0370508 | A1* | 11/2024 | Juravicius | G06F 16/951 |
| 2025/0175448 | A1* | 5/2025 | Bosworth | G06N 20/00 |
| 2025/0371478 | A1* | 12/2025 | Jha | G06Q 10/06393 |

OTHER PUBLICATIONS

Author unknown, "What is CAPTCHA?," IBM Topics, 2024, 18 pages, ibm.com, accessed Aug. 21, 2024, https://www.ibm.com/topics/captcha.

Dietrich et al., "What Languages Do We Speak in the United States?," United States Census Bureau, Dec. 6, 2022, 7 pages, census.gov, accessed Aug. 21, 2024, https://www.census.gov/library/stories/2022/12/languages-we-speak-in-united-states.html.

Grosjean, "The Amazing Rise of Bilingualism in the United States," Psychology Today, Sep. 11, 2018, 11 pages, psychologytoday.com, accessed Aug. 21, 2024, https://www.psychologytoday.com/ua/blog/life-bilingual/201809/the-amazing-rise-bilingualism-in-the-united-states.

LaFlair et al., "Digital-first assessments: A security framework," Journal of Computer Assisted Learning, Mar. 31, 2022, pp. 1077-1086, vol. 38, Issue 4, wiley.com, accessed Aug. 21, 2024, https://doi.org/10.1111/jcal. 12665.

Mathews, "Half of the world is bilingual. What's our problem?," Washington Post, Apr. 25, 2019, 2 pages, washingtonpost.com, accessed Aug. 21, 2024, https://www.washingtonpost.com/local/education/half-the-world-is-bilingual-whats-our-problem/2019/04/24/1c2b0cc2-6625-11e9-a1b6-b29b90efa879_story.html.

Rana et al., "Evolution of Captcha Types and Their Role in Security: a Review," International Research Journal of Modernization in Engineering Technology and Science, Mar. 2024, pp. 38-46, vol. 6, Issue 3, irjmets.com, accessed Aug. 21, 2024, https://www.irjmets.com/uploadedfiles/paper/issue_3_march_2024/49931/final/fin_irjmets1709386579.pdf.

Shomoossi et al., "Authenticity and Authentication in language Testing," Modern Journal of Applied Linguistics, Jan. 2010, pp. 1-26, vol. 2, researchgate.net, accessed Aug. 21, 2024, https://www.researchgate.net/publication/268813261_Authenticity_and_Authentication_in_language_Testing.

Tariq et al., "CAPTCHA Types and Breaking Techniques: Design Issues, Challenges, and Future Research Directions," arXiv, Jul. 16, 2023, pp. 1-46, arxiv.org, accessed Aug. 21, 2024, https://arxiv.org/abs/2307.10239.

Bergmann Dave, "What is machine learning?", Jan. 7, 2026, 14 pages, https://www.ibm.com/think/topics/machine-learning.

Bursztein et al., "How Good are Humans at Solving CAPTCHAs? A Large Scale Evaluation", 2010 IEEE Symposium on Security and Privacy, Jan. 2010, 15 pages.

Dietrich et al., "Nearly 68 Million People Spoke aLanguage Other Than English at Homein 2019", Dec. 6, 2022, 07 pages.

Stryker et al., "What is artificial intelligence (AI)?", IBM, Jan. 7, 2026, 15 pages, https://www.ibm.com/think/topics/artificial-intelligence.

* cited by examiner

COMPUTING ENVIRONMENT
100

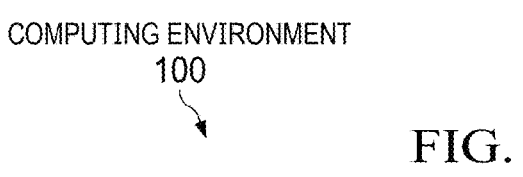

FIG. 1

COMPUTER 101

PROCESSOR SET 110

120 PROCESSING CIRCUITRY | CACHE 121

111 COMMUNICATION FABRIC

112 VOLATILE MEMORY

PERSISTENT STORAGE 113

122 OPERATING SYSTEM | AUTHENTICATOR 190

PERIPHERAL DEVICE SET 114

123 UI DEVICE SET | 124 STORAGE | IoT SENSOR SET 125

NETWORK MODULE 115

103

END USER DEVICE

PRIVATE CLOUD

106

WAN 102

REMOTE SERVER

REMOTE DATABASE

130

104

GATEWAY 140

PUBLIC CLOUD 105

141 CLOUD ORCHESTRATION MODULE | HOST PHYSICAL MACHINE SET 142

143 VIRTUAL MACHINE SET | CONTAINER SET 144

(TWO)          (SIX)
403            401

401            402
(SIX)          (THREE)

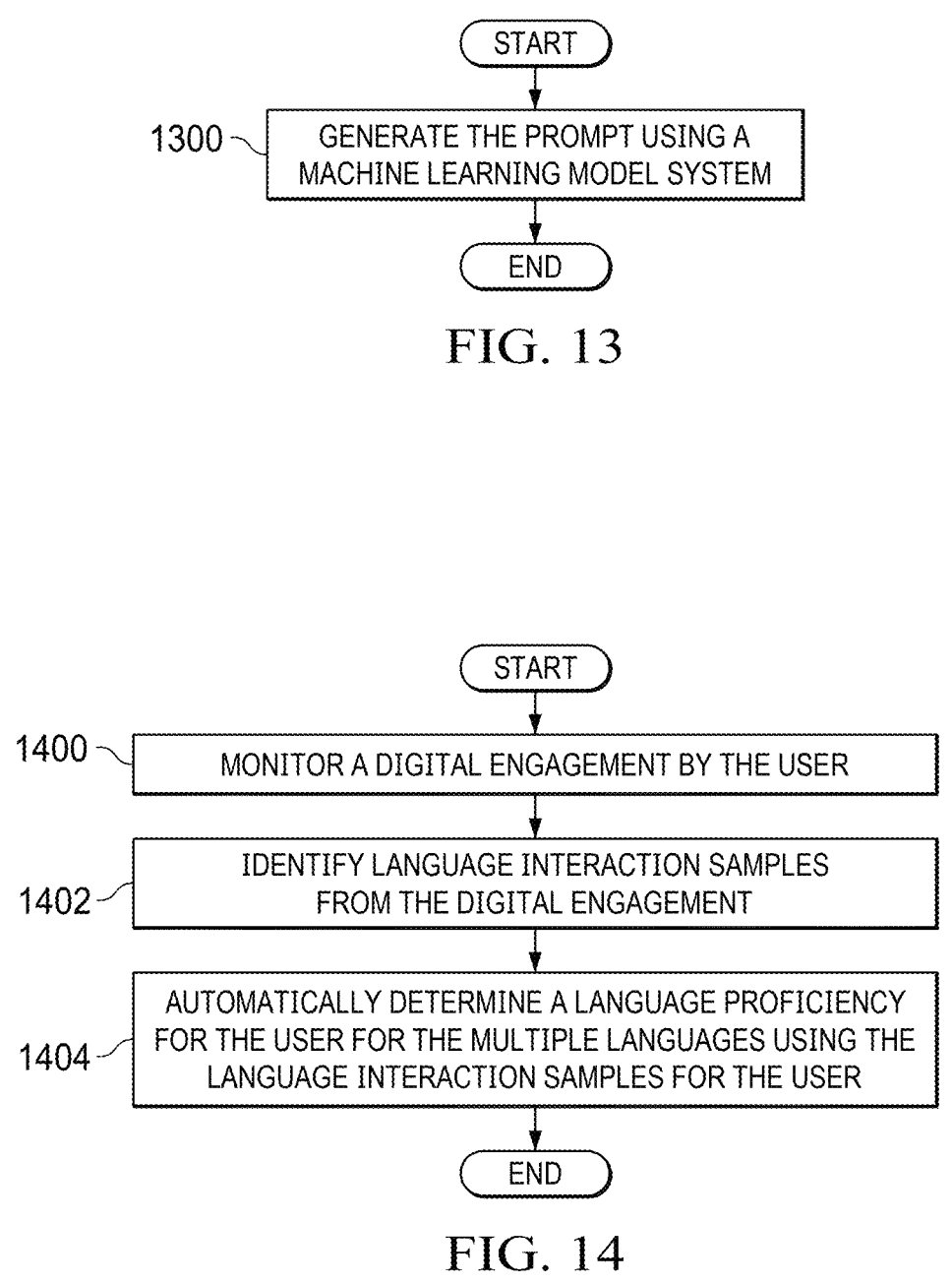

START

1300 〜 GENERATE THE PROMPT USING A
MACHINE LEARNING MODEL SYSTEM

END

FIG. 13

START

1400 〜 MONITOR A DIGITAL ENGAGEMENT BY THE USER

1402 〜 IDENTIFY LANGUAGE INTERACTION SAMPLES
FROM THE DIGITAL ENGAGEMENT

1404 〜 AUTOMATICALLY DETERMINE A LANGUAGE PROFICIENCY
FOR THE USER FOR THE MULTIPLE LANGUAGES USING THE
LANGUAGE INTERACTION SAMPLES FOR THE USER

END

FIG. 14

LINGUISTIC PROFICIENCY BASED PROTOCOLS

BACKGROUND

The disclosure relates generally to an improved computer system and more specifically to security protocols using linguistic proficiencies Increasing reliance on digital platforms is occurring as well as the widespread adoption of online services. These platforms can include platforms that provide services such as banking, commercial transactions, healthcare portals, investment services, critical current exchanges, and other services.

With these and other types of services, security mechanisms are important to prevent unauthorized access and cyber security attacks on the services and platforms on which the services are located. Security authentication methods can be used to prevent unauthorized access to services, reduce automated attacks, and reduce other undesired types of access. Two types of security authentication methods are two factor authentication (2FA) and Completely Automated Public Turing test to tell Computers and Humans Apart (CAPTCHA).

Two factor authentication is a security mechanism that enhances protection of accounts by requiring two forms of verification for granting access. This type of authentication involves an additional form of verification in addition to the standard education process to confirm the identity of the user. A first factor can be a user password. A second factor can be a token. This token can be, for example, a one-time password sent to a mobile device. Another example can be a biometric factor such as a fingerprint. As another example, the user may be asked to launch a specific app on the user's mobile phone and click on a link to approve the identity of the user.

CAPTCHA is a security mechanism to verify that a user acting with a service is a human instead of an automated bot. This type of security mechanism involves a challenge response test that ensures the responses are received from a human user to prevent unauthorized automated access by an automated bot or other software application. CAPTCHA can be easy for humans to solve but difficult for automated bots to solve correctly. This challenge can include recognizing distorted text, identifying objects and images, or other types of challenges.

SUMMARY

According to one illustrative embodiment, a method for accessing a resource. A set of language affinities for multiple languages is identified in response to receiving a request from a client device for a user to access the resource. The user is authenticated using the set of language affinities for the multiple languages. According to other illustrative embodiments, a computer system and a computer program product for accessing a resource are provided.

BRIEF DESCRIPTION OF THE DRAWINGS

FIG. 1 is a block diagram of a computing environment in accordance with an illustrative embodiment;

FIG. 13 is a flowchart of a process for generating a prompt in accordance with an illustrative embodiment;

FIG. 14 is a flowchart of a process for determining a proficiency of the user in accordance with an illustrative embodiment.

DETAILED DESCRIPTION

Figure 2:
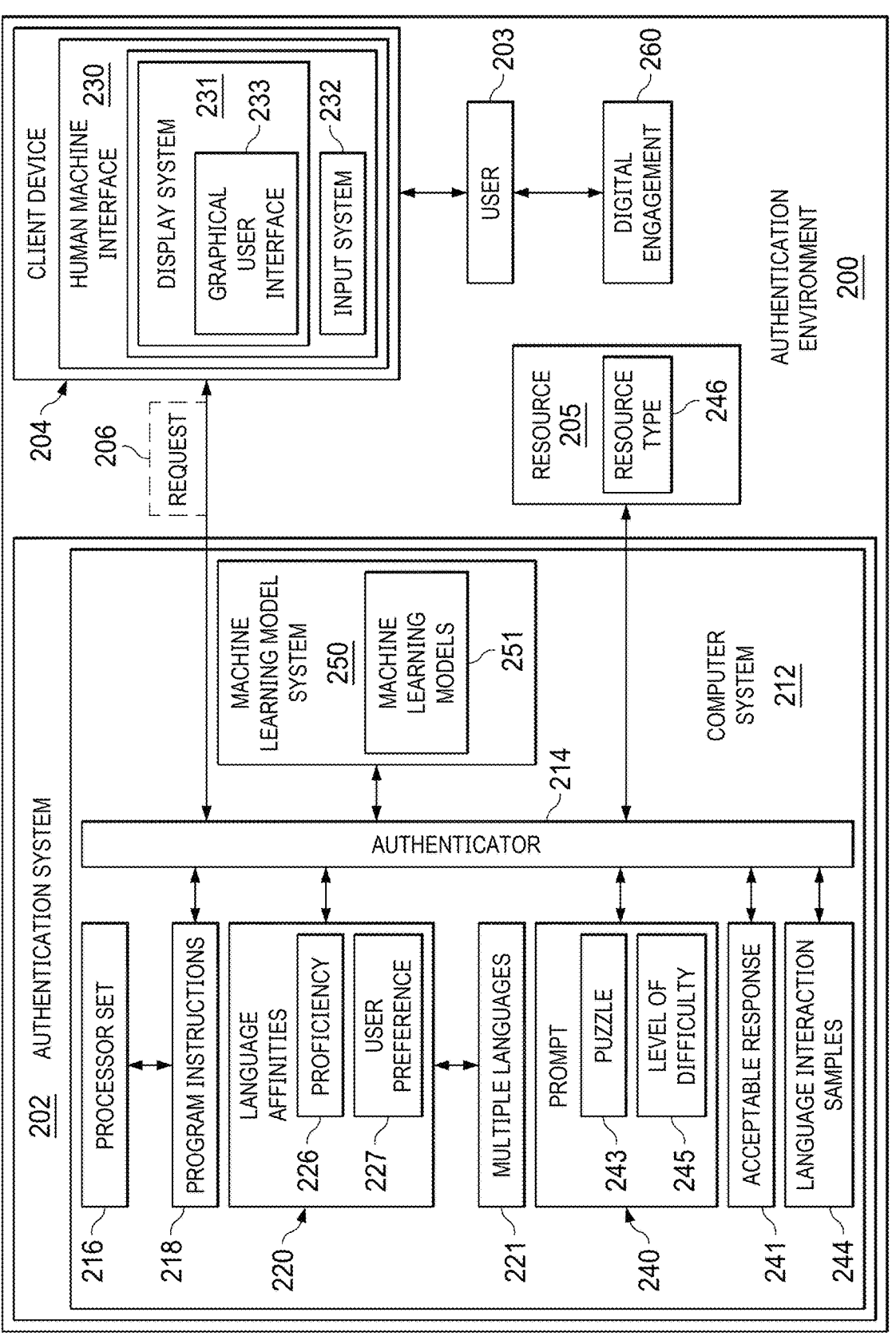
FIG. 2 is a block diagram of an authentication environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as authenticator 190. In addition to authenticator 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and authenticator 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in authenticator 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in authenticator 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer

101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. Current security mechanisms such as 2FA and CAPTCHA can create usability challenges for users and can leave digital spaces susceptible to a spectrum of cybersecurity threats when inefficiently or poorly implemented.

These cybersecurity threats include unauthorized access, data breaches, and sophisticated attacks that compromise the overall integrity of the software environment. For example, current digital security is impaired by the inefficiencies and vulnerabilities associated with widely adopted authentication mechanisms such as 2FA and CAPTCHA that use mobile phones or physical tokens. While these security mechanisms are designed to enhance security, the implementation can fall short resulting in exposing platforms to various cybersecurity threats. The inadequate nature of these authentication mechanisms not only compromises user experience but also leaves online and internal platforms such as messaging platforms and cloud storage services susceptible to unauthorized access, data breaches, and evolving sophisticated cyber-attacks. For example, CAPTCHA can be circumvented by sophisticated bots for automated tools.

Further, these current techniques can be inconvenient and time-consuming. For example, 2FA can rely on a mobile device for receiving a one-time code that is used in addition to user identifier and password to verify the user's identity. In some cases, this mechanism is inconvenient because the user may not always have access to a mobile device to obtain the one-time passcode. As another example, CAPTCHA can provide challenges that can be difficult to resolve, leading to undesired user frustration. As another example, CAPTCHA is associated with asking a user to accomplish a task (e.g., find all images with bridges, solve a mathematical problem, drag a slider). Differently, the illustrative examples do not require providing the user with an explicit task. Instead, the task is hidden in the puzzle (e.g., in Hebrew, how much is two plus four). Thus, the illustrative example triggers the user to understand what the prompt is, making this system more robust against hacking attacks.

With these deficiencies in security mechanisms and inconveniences to users, it is desirable to have security mechanisms in addition to or in place of 2FA and CAPTCHA for enabling secure digital authentication transactions to obtain access to protected resources. For example, a user-based language-based authentication can be used with or in place of authentication mechanisms such as 2FA and CAPTCHA. With this type of system, users can personalize their authentication process through familiar language elements. This type of approach using language-based security mechanisms that leverages the language proficiencies of users can strengthen the security and reduce usability issues associated with current security mechanisms.

Thus, incorporating language customization enables implementing unique security mechanisms for authenticating access to resources. This type of security mechanism significantly increases the difficulty for malicious actors to exploit system vulnerabilities. For example, a method can be used for accessing a resource in which a set of language affinities for multiple languages is identified in response to a request from a client device for a user to access the resource. The user is authenticated using the set of language affinities for the multiple languages. In other words, the set of language affinities that a user has for two or more languages can be used to authenticate the user to access a resource. In this illustrative example, a language affinity can include at least one of a proficiency or preference for a language. Further, the phrase "at least one of," when used with a list of items, means different combinations of one or more of the listed items can be used, and only one of each item in the list may be needed. In other words, "at least one of" means any combination of items and a number of items may be used from the list, but not all of the items in the list are required. The item can be a particular object, a thing, or a category.

In this illustrative example, "a set of" when used with reference items means one or more items. For example, a set of language affinities is one or more language affinities. As described above, these affinities can be at least one of a proficiency or preference for a particular language.

Also in this example, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

With reference now to FIG. 2, a block diagram of an authentication environment is depicted in accordance with an illustrative embodiment. In this illustrative example, authentication environment 200 includes components that can be implemented in hardware such as the hardware shown in computing environment 100 in FIG. 1. In this example, authentication system 202 can operate to authenticate user 203 operating client device 204 to access resource 205. This authentication can be in real time for transaction requests such as automatic teller machine withdrawals, online purchases, real-time document collaboration, and types of requests with respect to resource 205. In this example, user 203 sends request 206 from client device 204 to request access to resource 205. In this illustrative example, the communications between authentication system 202 and client device 204 are performed using secure communications channels and protocols.

Client device 204 can take a number of different forms. For example, client device 204 can be selected from a group comprising an automatic teller machine (ATM), a point of sale (POS) system, a mobile device, a mobile phone, a computer, a tablet, and other devices that can send requests for accessing resources. Further in this example, resource 205 can be selected from a group comprising an automated teller platform, a point-of-sale platform, a website, a collaboration tool, a database, a storage system, a building, a secure room, a sensitive compartmented information facility, and other types of resources that require authentication for access.

In this illustrative example, authentication system 202 comprises computer system 212 and authenticator 214. As depicted, the authenticator 214 is located in computer system 212. Authenticator 190 in FIG. 1 is an example of an implementation for authenticator 214.

Authenticator 214 can be implemented in software, hardware, firmware or a combination thereof. When software is used, the operations performed by authenticator 214 can be implemented in program instructions configured to run on hardware, such as a processor unit. When firmware is used, the operations performed by authenticator 214 can be implemented in program instructions and data and stored in persistent memory to run on a processor unit. When hardware is employed, the hardware can include circuits that operate to perform the operations in authenticator 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes processor set 216 that is capable of executing program instructions 218 implementing processes in the illustrative examples. In other words, program instructions 218 are computer-readable program instructions. Processor set 216 is an example of processor set 110 in FIG. 1.

As used herein, a processor unit in processor set 216 is a hardware device and is comprised of hardware circuits such as those on an integrated circuit that respond to and process instructions and program code that operate a computer. Processor set 216 can be a number of processor units that can be implemented using processor set 110 in FIG. 1. The processor units can also be referred to as computer processors. When processor set 216 executes program instructions 218 for a process, processor set 216 can be one or more processor units that are in the same computer or in different computers. In other words, the process can be distributed between processor units in processor set 216 on the same or different computers in computer system 212.

Further, processor set 216 can include the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, processor set 216 can also include other components in addition to the processor units or processing circuitry. For example, processor set 216 can also include a cache or other components used with processor units or other processing circuitry.

In this example, authenticator 214 identifies a set of language affinities 220 for multiple languages 221 in response to request 206 from client device 204 for user 203 to access the resource 205. Language affinities 220 can include at least one of proficiency 226 or user preference 227 for languages in multiple languages 221. Proficiency 226 and user preference 227 are for user 203. With user preference 227, user 203 can select or enter settings for preferences of multiple languages 221. With proficiency 226, user 203 can enter a proficiency level such as beginning, conversational, expert, or some other level. Analysis of language use by user 203 can be performed to determine the proficiency level for proficiency 226.

Authenticator 214 authenticates user 203 using the set of language affinities 220 for multiple languages 221. In this example, authentication involves the process of verifying the identification of user 203. In this illustrative example, user 203 interacts with client device 204 to generate request 206 and perform authentication using human machine interface 230 in client device 204. Human machine interface 230 comprises display system 231 and input system 232.

Display system 231 in human machine interface 230 is a physical hardware system and includes one or more display devices on which graphical user interface 233 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 203 is a person that can interact with graphical user interface 233 through user input generated by input system 232 for client device 204. This input can initiate various actions such as sending request 206 to authenticator 214. Input system 232 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device.

In authenticating user 203, authenticator 214 generates prompt 240 using multiple languages 221. Prompt 240 is a personalized language-based authentication prompt. In this example, prompt 240 can be one or more languages selected from multiple languages 221. Authenticator 214 also generates acceptable response 241 to prompt 240 for authenticating user 203 to access resource 205 using multiple languages 221.

Authenticator 214 sends prompt 240 to client device 204 for user 203. In this example, the prompt is presented to user 203 through human machine interface 230. Authenticator 214 authorizes access to resource 205 in response to receiving an acceptable response 241 from client device 204.

In this illustrative example, prompt 240 can be puzzle 243. This puzzle uses multiple languages 221. In one illustrative example, puzzle 243 can be a question. The question can include words all in the same language or in different languages selected from multiple languages 221. Acceptable response 241 can be in the same language or languages as the question or in a different language.

In another illustrative example, puzzle 243 can comprise information encoded in a number of multiple languages 221. With this example of puzzle 243, an acceptable response 241 to puzzle 243 is in the number of multiple languages 221. In other words, puzzle 243 can be in one or more languages in multiple languages 221. Further, an acceptable response to 241 can also be in one or more languages. These languages can be the same or different languages from the number of languages used in puzzle 243.

In another illustrative example, in generating prompt 240, authenticator 214 determines proficiency 226 of user 203 for multiple languages 221 in the set of language affinities 220. This proficiency can be determined based on information stored in a profile for user 203.

In another illustrative example, proficiency 226 can be determined by monitoring the digital engagement 260 of user 203. In this illustrative example, digital engagement 260 is user interaction relevant to language use. Digital engagement 260 can include user 203 performing at least one of accessing websites, interacting with social media, forming transactions, sending email messages, or other types of actions. In monitoring the digital engagement 260, authenticator 214 can identify language interaction samples 244 from this digital engagement and automatically determine a language proficiency for user 203 for multiple languages 221 using language interaction samples 244. Authenticator 214 generates prompt 240 using multiple languages 221 in which prompt 240 has a level of difficulty 245 based on proficiency 226 of user 203.

In another example, authenticator 214 can generate prompt 240 using multiple languages 221 in which prompt 240 has level of difficulty 245 based on resource type 246 of resource 205.

In this example, a particular language or languages can be used as a unique identifier for user 203. The user may select a particular language for use in the authentication process formed by authenticator 214. For example, user 203 may expect Hebrew as the selected language for prompt 240 in performing authentication to access resource 205.

In these different illustrative examples, prompt 240 can be generated using a number of different techniques. In this example, machine learning model system 250 comprises a number of machine learning models 251. In one illustrative example, each machine learning model in machine learning models 251 is trained to generate a prompt for a particular language in multiple languages 221.

Machine learning models 251 in machine learning model system 250 can include large language models (LLMs) as well as other types of models that can generate and analyze prompts. Thus, machine learning such as those using large language models can be used to create prompts, as well as to analyze existing prompts.

In yet another illustrative example, prompt 240 can comprise a number of multiple languages 221 selected based on how many people speak multiple languages 221 in a geographic area. For example, user 203 has an affinity for languages including Hebrew, English, and Spanish. If user 203 is located in Israel, then the language selected may be Spanish. If user 203 is located in the United States, the language selected may be Hebrew. In this manner, the language can be selected such that a lower probability is present that someone speaks the selected language.

Thus, illustrative embodiments provide a computer implemented method, computer system, and computer program product for accessing a resource. In one illustrative example, a method accesses a resource using authentication method. A set of language affinities for multiple languages is identified in response to receiving a request from a client device for a user to access the resource. The user is authenticated using the set of language affinities for the multiple languages.

Thus, authentication based on languages can be personalized to users. By using language affinities for user, the user can perform authentication using one or more familiar languages. This authentication method can be used in place of or to supplement other authentication methods such as 2FA and CAPTCHA. Further, this type of authentication method does not require the user to have access to a device such as a mobile phone. Instead, the user can form this authentication on the client device directly. The client device can be, for example, an ATM machine, POS machine, or some type of device that can be used to request access to a resource. As a result, at least one of increased security or s reduced user frustration can be achieved.

In one illustrative example, one or more technical solutions are present that overcome a problem with security and user experience using current authentication techniques such as 2FA and CAPTCHA. As a result, one or more technical solutions may provide a technical effect of at least one of increasing security enhancements for improved user experience in the authentication process to access resources. In the illustrative example, authenticator 214 incorporates languages used by a user based on the language affinities that the user has for multiple languages. For example, in addition to using a password and user ID or other initial factors for the negation, a prompt is generated in a selected language for multiple languages in which the user inputs specific text in response to the prompt in the selected language. The selected language can be, for example, Hebrew, Spanish, or some other language for which the user has an affinity such as a preference or proficiency. Thus, the user language is used as a unique identifier, enhancing security while providing a seamless and accessible authentication process.

Computer system 212 can be configured to perform at least one of the steps, operations, or actions described in the different illustrative examples using software, hardware, firmware or a combination thereof. As a result, computer system 212 operates as a special purpose computer system in which authenticator 214 in computer system 212 enables authenticating user to access resources using a linguistic based authentication process that is based on the affinities that users have to languages. In particular, authenticator 214 transforms computer system 212 into a special purpose computer system as compared to currently available general computer systems that do not have authenticator 214. This special purpose computer system provides the accreditation that is based on language affinities that users have. Thus, each user may have a different prompt for performing implementation based on the language affinity of that user.

In the illustrative example, the use of authenticator 214 in computer system 212 integrates processes into a practical application for user to access resources in other words, authenticator 214 in computer system 212 is directed to a practical application of processes integrated into authenticator 214 in computer system 212 that authenticates a user in order to provide access to a resource. In other words, authenticator 214 provides another authentication system for accessing resources in addition to current techniques.

The illustration of authentication environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, authenticator 214 can operate to provide authentication services for users in addition to or in place of user 203. Further, authenticator 214 can be used to provide authentication for one or more resources in addition to resource 205. In some illustrative examples, authenticator 214 can be located in resource 205. In yet another illustrative example, authenticator 214 can be located in client device 204.

Figure 3:
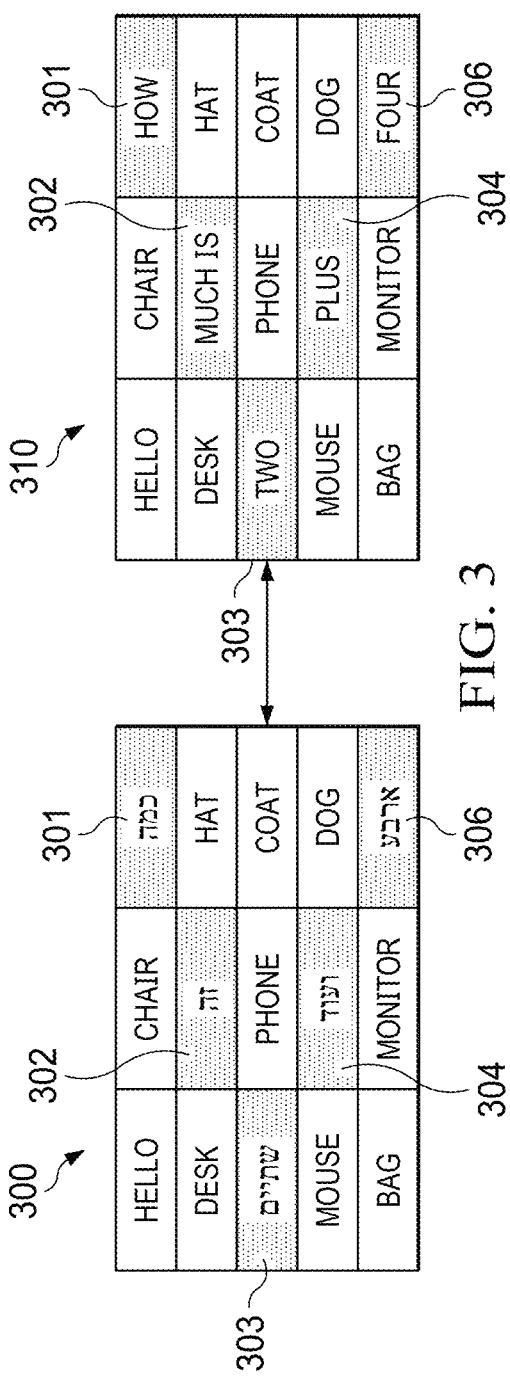
FIG. 3 is an illustration of a prompt in the form of a puzzle in accordance with an illustrative embodiment.

With reference to FIG. 3, an illustration of a prompt in the form of a puzzle is depicted in accordance with an illustrative embodiment. In the illustrative example, puzzle 300 is an example of puzzle 243 in FIG. 2. As depicted, puzzle 300 encodes information in multiple languages. In this example, this information is encoded in English and Hebrew. The information encoded forms a hidden question in Hebrew that requires the user to be able to read Hebrew and generates an answer as an acceptable response in the authentication process.

In this example, entry 301, entry 302, entry 303, entry 304, and entry 306 is in Hebrew, while the remaining entries are in English. This puzzle requires the user to be able to read Hebrew to identify the question and provide an answer as a response to puzzle 300. Translated view 310 of puzzle 300 shows entry 301, entry 302, entry 303, entry 304, and entry 306 in English. As can be seen, a user viewing puzzle 300 can determine that the question is "how much is two plus four" and return six as the acceptable response to puzzle 300.

Figure 4:
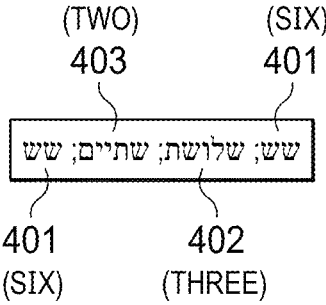
FIG. 4 is an illustration of a prompt in accordance with an illustrative embodiment.

With reference to FIG. 4, another illustration of a prompt is depicted in accordance with an illustrative embodiment. In this illustrative example, prompt 400 encodes information in Hebrew that is to be entered in English as part of the authentication process. In this example, prompt 400 is another example of prompt 240 in FIG. 2. As depicted, prompt 400 comprises four words in Hebrew in which each word represents a number. As depicted, the four in English are "six" 401, "three" 402, "two" 403, and "six" 404. In this example, the number is "6326," which is to be entered as the acceptable response.

This type of prompt can be sent in place of a traditional two factor authentication code. For example, a user can insert a debit card in an ATM machine and enter a pin. The graphical user interface on the ATM machine can request a second number to be entered from the prompt displayed in the graphical user interface.

Figure 5:
FIG. 5 is an illustration of a prompt in accordance with an illustrative embodiment.

With reference to FIG. 5, another illustration of a prompt is depicted in accordance with an illustrative embodiment. In this example, prompt 500 is in Hebrew and requests that the user type a number. In this example, the prompt says "please type fourteen" in Hebrew.

In this example, this prompt can be generated in response to the user using a credit card for payment at a POS machine. The credit card can be associated with the language affinities for the user, which is Hebrew in this example. As a result, during checkout, prompt 500 is displayed and the user enters "14" to complete the transaction at the POS machine.

Figure 6:
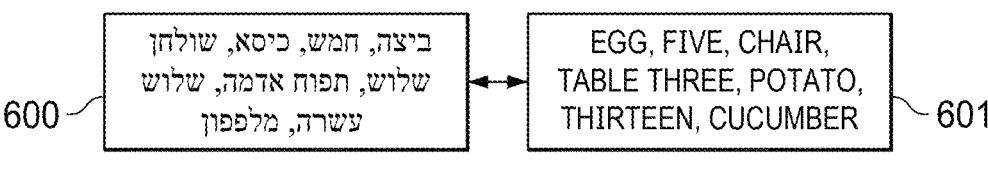
FIG. 6 is an illustration of a prompt in accordance with an illustrative embodiment.

With reference now to FIG. 6, an illustration of a prompt is depicted in accordance with an illustrative embodiment. In the illustrative example, prompt 600 is an example of an implementation for prompt 240 in the form of puzzle 243 and FIG. 2. In this example, prompt 240 is a puzzle that encodes information in Hebrew. The user is asked to enter how many numbers appear in the text in prompt 600. In this example, translated view 601 shows that the numbers "five," "three," and "thirteen" are present. As a result, the answer for an acceptable response is three.

FIGS. 3-6 are examples of some implementations for prompt 240 in FIG. 2. These illustrations of prompts and their uses are not meant to limit the manner in which other illustrative examples can be implemented. For example, the prompts can use other languages such as Spanish, Chinese, Portuguese, or other languages. Further, the prompts encoding information can be in more than one language. For example, a prompt for a question can be in both Hebrew and Spanish. Further, prompts can be used in other situations other than transactions at an ATM machine or a POS machine. For example, prompts can be used for banking transactions such as wire transfers. These prompts can be implemented in banking applications used on computers or mobile phones. As another example, prompts can be used during passport checks. The affinity for a particular language can be associated with a passport. The person with the passport can then be asked to answer a question in a language selected from an affinity for the particular language.

In other examples, this authentication process can be used for personal banking security, e-commerce checkout, travel in immigration, and other suitable processes in which secure authentication is desired. For example, with personal banking, the prompts can be used in place of traditional 2FA and CAPTCHA methods that can be time-consuming and challenging. For example, the user may not always have their mobile device accessible. Spanish that is in a language affinity for the user can be used by the authentication system in a payment gateway to complete a purchase. This type of problem may be specific and easier for a bilingual user to complete without adding complexity or time to a checkout experience. As another example, travel and immigration in airports can use this type of authentication system in which a traveler is presented with a language-based verification task based on their language affinities as identified on travel documents or in the database. This type of authentication can verify the identity of a traveler more securely and efficiently, reducing risk of fraud, and speeding up the process for travel.

Figure 7:
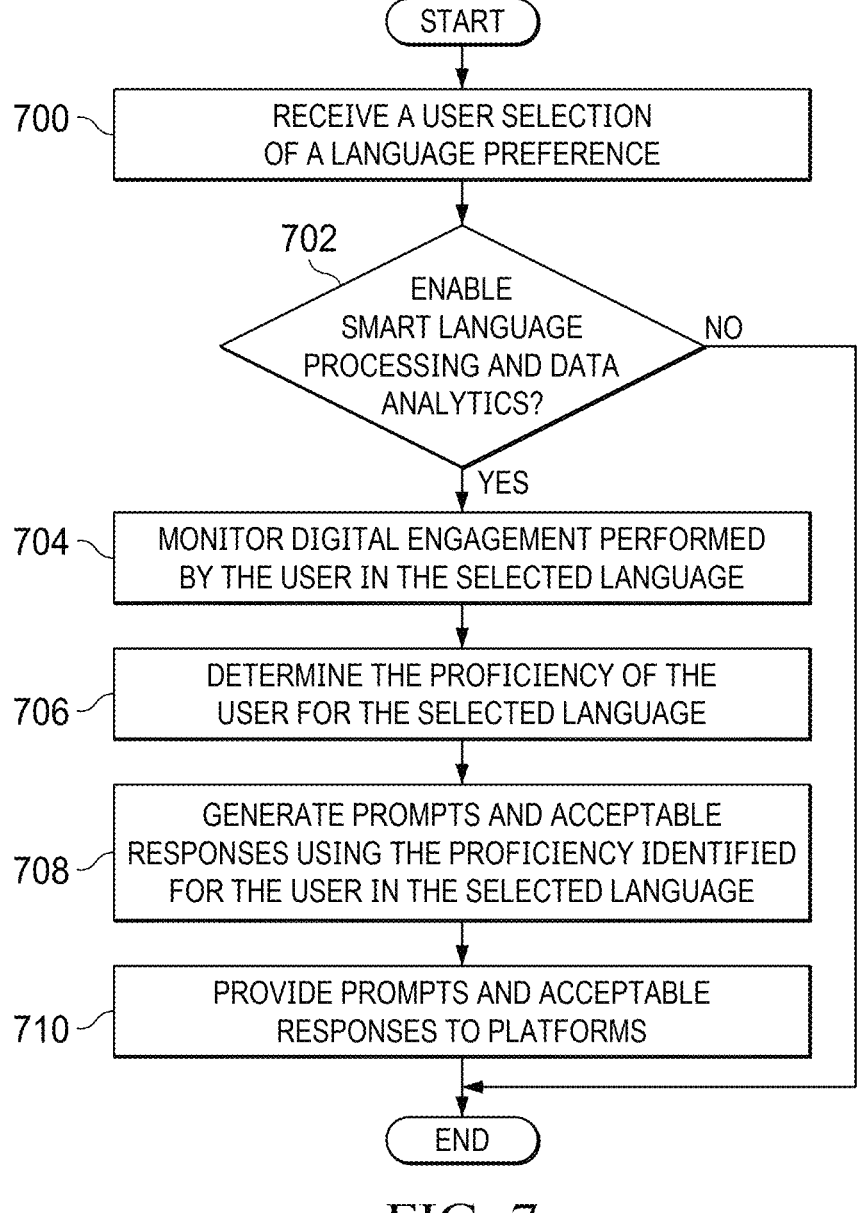
FIG. 7 is a flowchart of a process for forming language-based authentication in accordance with an illustrative embodiment.

With reference now to FIG. 7, a flowchart of a process for forming language-based authentication is depicted in accordance with an illustrative embodiment. The process depicted in this figure can be implemented in hardware, software, or both. When implemented in software, the process can take the form of program instructions that are run by a processor set located in one or more hardware devices in one or more computer systems. For example, the process can be implemented in using authentication system 202 in authentication environment 200 in FIG. 2.

The process begins by receiving a user selection of a language preference (step 700). This language preference can be saved as a language affinity for the user.

The process then determines whether to enable smart language processing and data analytics (step 702). In step 702, this type of processing can be enabled based on the user input. When enabled in step 702, authenticator 214 can intelligently analyze a user's language patterns in the selected language using advanced natural language processing and data analytics technologies and can include the use of machine learning models that can perform natural language processing and data analytics. The process terminates if this feature is not enabled.

Otherwise, the process monitors digital engagement performed by the user in the selected language (step 704). In step 704, the process can gather and examine online activities such as social media posts, comments, and interactions in a particular language such as Hebrew. The content from these activities are language interaction samples. The process can use natural language processing and sentiment analysis to evaluate the user's proficiency and fluency in the selected language, based on the digital content and engagement in the language interaction samples.

The process determines the proficiency of the user for the selected language (step 706). In this step, machine learning techniques are used to analyze the language interaction samples from the user's historical interactions and responses in the selected language, providing an accurate gauge of language proficiency. Machine learning models can implement natural language processing and sentiment analysis to evaluate the user's proficiency and fluency in the selected language based on the content and engagement determined from the language interaction samples.

Further, behavioral profiling can be used to construct user profiles that reflect linguistic patterns, vocabulary usage, and syntactic structures identified in the user's online activities. Machine learning models will be employed to detect these patterns and can be used to determine the proficiency of the user in the selected language. For example, nuances in the proficiency can be determined between casual and formal uses of a language such as Hebrew.

The process generates prompts and acceptable responses using the proficiency identified for the user in the selected language (step 708). The process then provides prompts and acceptable responses to platforms (step 710). In this example, these platforms can be, for example, ATM machines and POS machines.

This process can be repeated to obtain additional language interaction samples for the user and provide an evolved evaluation of the proficiency of the user for the selected language. This process can also be performed to analyze other languages that may be used by the user but not selected to determine proficiencies and potentially update user affinities.

Figure 8:
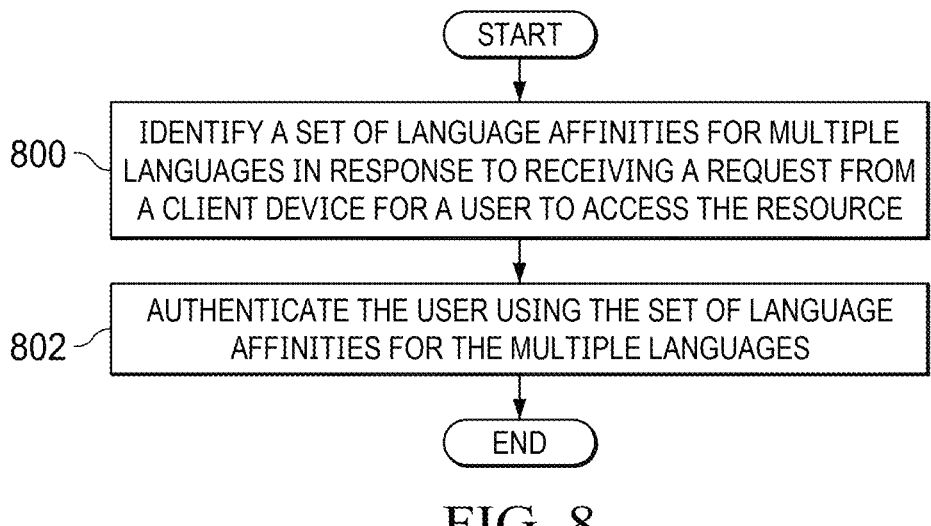
FIG. 8 is a flowchart of a process for accessing a resource in accordance with an illustrative embodiment.

Turning next to FIG. 8, a flowchart of a process for accessing a resource is depicted in accordance with an illustrative embodiment. The process in FIG. 8 can be implemented in hardware, software, or both. When implemented in software, the process can take the form of program instructions that are run by a processor set located in one or more hardware devices in one or more computer systems. For example, the process can be implemented in authenticator 214 in computer system 212 in FIG. 2.

The process begins by identifying a set of language affinities for multiple languages in response to receiving a request from a client device for a user to access the resource (step 800). The process authenticates the user using the set of language affinities for the multiple languages (step 802). The process terminates thereafter.

Figure 9:
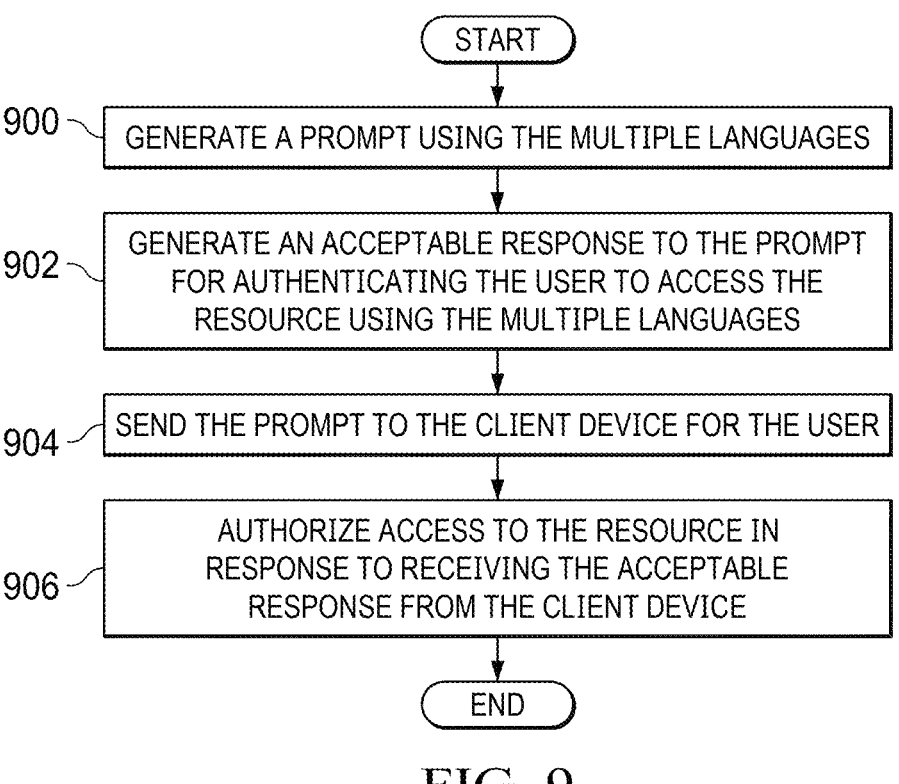
FIG. 9 is a flowchart of a process for authenticating user in accordance with an illustrative embodiment.

In reference next to FIG. 9, a flowchart of a process for authenticating the user is depicted in accordance with an illustrative embodiment. The process in this flowchart is an example of an implementation for step 802 in FIG. 8.

The process generates a prompt using the multiple languages (step 900). The process generates an acceptable response to the prompt for authenticating the user to access the resource using the multiple languages (step 902). In step 902, the prompt can be a puzzle. This puzzle can be, for example, a question. In another example, the puzzle can be information encoded in any number of languages. With this type of puzzle, an acceptable response can be in the multiple languages.

The process sends the prompt to the client device for the user (step 904). The process authorizes access to the resource in response to receiving the acceptable response from the client device (step 906). The process terminates thereafter.

Figure 10:
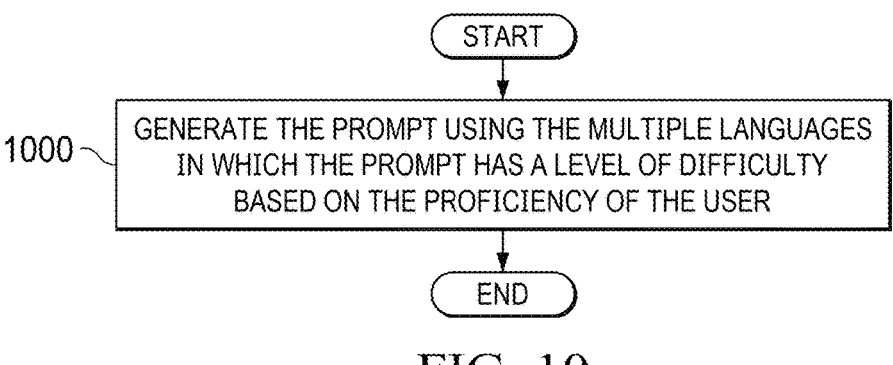
FIG. 10 is a flowchart of a process for generating a prompt in accordance with an illustrative embodiment.

With reference now to FIG. 10, a flowchart of a process for generating a prompt is depicted in accordance with an illustrative embodiment. The process in this flowchart is an example of an implementation for step 900 in FIG. 9.

The process generates the prompt using the multiple languages in which the prompt has a level of difficulty based on the proficiency of the user (step 1000). The process terminates thereafter. In step 1000, the proficiency of the user for the multiple languages in the set of language affinities can be determined in any number of different ways. For example, the proficiency of the user in the multiple languages can be determined from a user profile. In another example, proficiency can be identified from analyzing language interaction samples such as emails, documents, memos, social media posts, voice messages, video, and other samples that can indicate a proficiency of the user for different languages. This analysis can be made using a machine learning model or other software systems that can analyze language interaction samples for proficiency.

Figure 11:
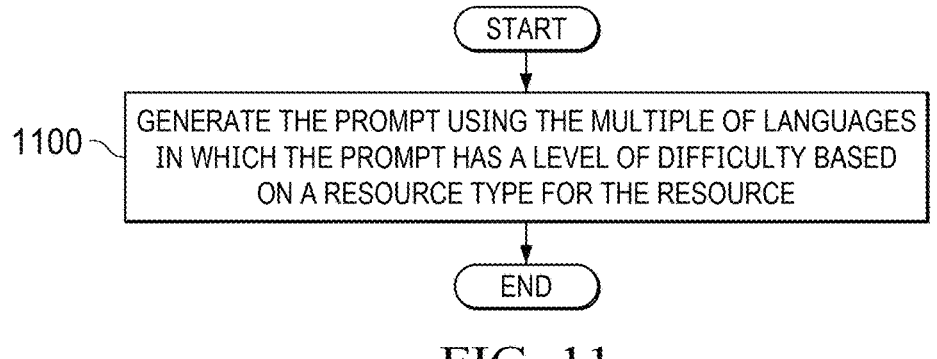
FIG. 11 is a flowchart of a process for generating a prompt in accordance with an illustrative embodiment.

Next in FIG. 11, a flowchart of a process for generating a prompt is depicted in accordance with an illustrative embodiment. The process in this flowchart is an example of an implementation for step 900 in FIG. 9.

The process generates the prompt using the multiple of languages in which the prompt has a level of difficulty based on a resource type for the resource (step 1100). The process terminates thereafter.

Figure 12:
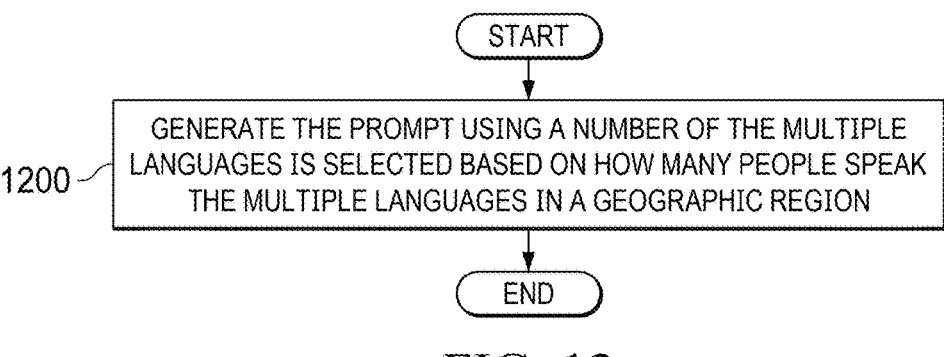
FIG. 12 is a flowchart of a process for generating a prompt in accordance with an illustrative embodiment.

Turning to FIG. 12, a flowchart of a process for generating a prompt is depicted in accordance with an illustrative embodiment. The process in this flowchart is an example of an implementation for step 900 in FIG. 9.

The process generates the prompt using a number of the multiple languages is selected based on how many people speak the multiple languages in a geographic region (step 1200). The process terminates thereafter. In step 1200, a language can be selected from the multiple languages to make it less likely that someone would be able to read the language in the prompt. In other words, a language can be selected that is less prevalent for the location of the user.

In FIG. 13, a flowchart of a process for generating a prompt is depicted in accordance with an illustrative embodiment. The process in this flowchart is an example of an implementation for step 900 in FIG. 9.

The process generates the prompt using a machine learning model system (step 1300). The process terminates thereafter.

With reference now to FIG. 14, a flowchart of a process for determining a proficiency of the user is depicted in accordance with an illustrative embodiment. The process in this flowchart is an example of additional steps that can be performed with the steps in FIG. 8.

The process monitors a digital engagement by the user (step 1400). The process identifies language interaction samples from the digital engagement (step 1402). This digital engagement can be the activities of the user in which language interaction samples are generated. The samples can be, for example, an email message, a social media posting, a voicemail message, a video, an audio file, or other file that contains a sample of language used by the user.

The process automatically determines a language proficiency for the user for the multiple languages using the language interaction samples for the user (step 1404). The process terminates thereafter. In step 1404, the determination of proficiency can be formed using software such as machine learning models in the machine learning model system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
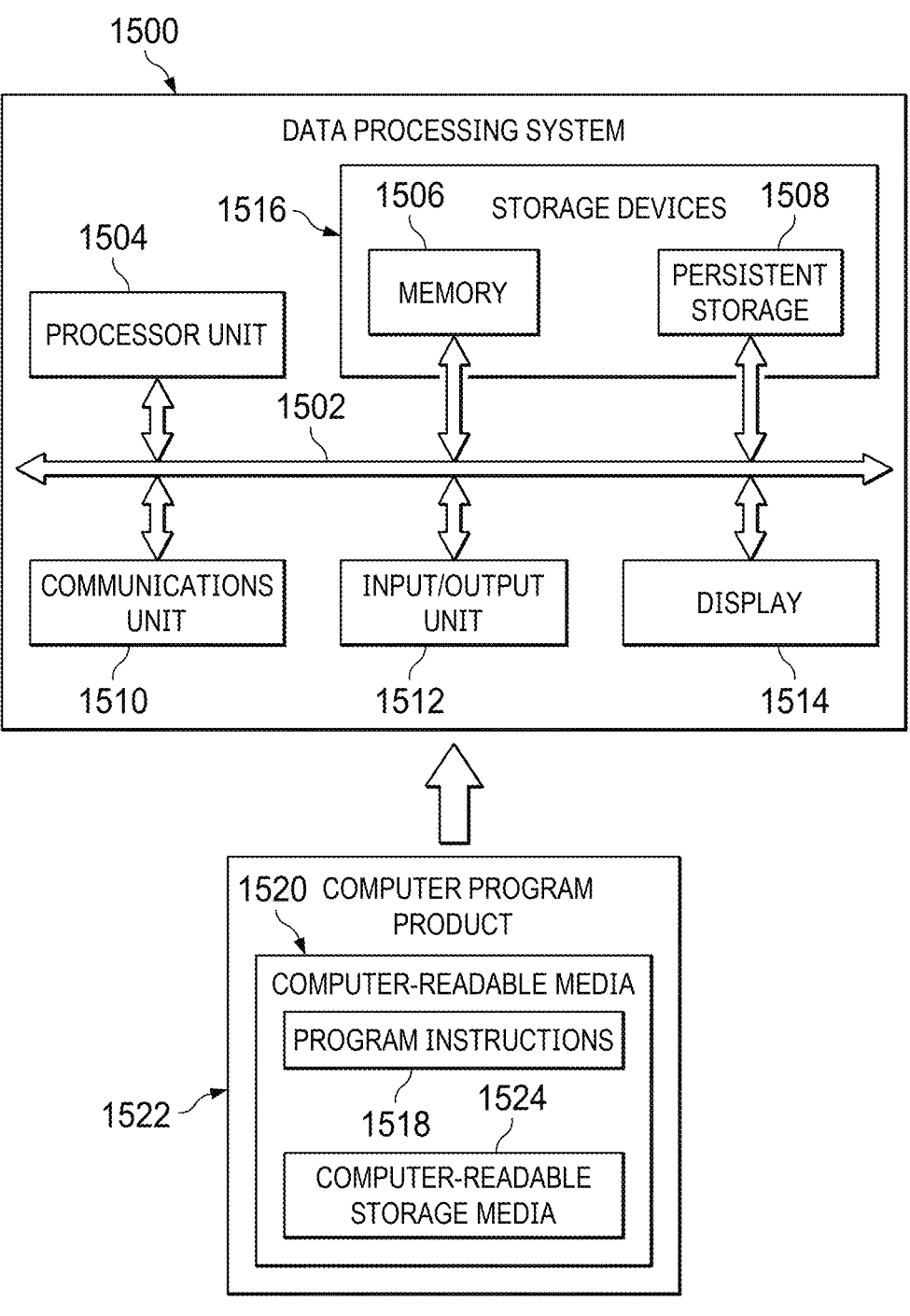
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer-readable program instructions that can be read and executed by a processor in processor unit 1504. The program instructions in the different embodiments can be embodied on different physical or computer-readable storage media, such as memory 1506 or persistent storage 1508.

Program instructions 1518 are located in a functional form on computer-readable media 1520 that is selectively removable and can be loaded onto or transferred to data processing system 1500 for execution by processor unit 1504. Program instructions 1518 and computer-readable media 1520 form computer program product 1522 in these illustrative examples. In the illustrative example, computer-readable media 1520 is computer-readable storage media 1524.

Computer-readable storage media 1524 is a physical or tangible storage device used to store program instructions 1518 rather than a medium that propagates or transmits program instructions 1518. Computer-readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer-readable signal media. The computer-readable signal media are signals and can be, for example, a propagated data signal containing program instructions 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1520" can be singular or plural. For example, program instructions 1518 can be located in computer-readable media 1520 in the form of a single storage device or system. In another example, program instructions 1518 can be located in computer-readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer-readable media 1520 in a server computer while another portion of program instructions 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. In other examples, more than one processor unit can be present. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments of the present invention provide a computer implemented method, computer system, and computer program product for accessing a resource. In one illustrative example, a method accesses a resource using authentication method. A set of language affinities for multiple languages is identified in response to receiving a request from a client device for a user to access the resource. The user is authenticated using the set of language affinities for the multiple languages.

As result, authentication based on languages can be personalized to users. By using language affinities for user, the user can perform authentication using one or more familiar languages. This authentication method can be used in place of or to supplement other authentication methods such as 2FA and CAPTCHA. Further, this type of authentication method does not require the user to have access to a device such as a mobile phone. Instead, the user can form this authentication on the client device directly. The client device can be, for example, an ATM machine, POS machine, or some type of device that can be used to request access to a resource. As a result, at least one of increased security or s reduced user frustration can be achieved.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for accessing a resource, the method comprising:

identifying a set of language affinities for multiple languages in response to receiving a request from a client device for a user to access the resource;

generating a prompt using the multiple languages, wherein the prompt is a puzzle using the multiple languages, and wherein the puzzle comprises information encoded in a number of the multiple languages;

determining an acceptable response to the prompt, wherein the acceptable response to the puzzle requires input in the number of the multiple languages;

sending the prompt to the client device for the user;

authenticating the user based on the set of language affinities for the multiple languages in response to receiving a response from the client device that matches the acceptable response; and authorizing access to the resource based on the authentication.

2. The method of claim 1, wherein the puzzle is a question using the multiple languages.

3. The method of claim 1, wherein generating the prompt comprises:

generating the prompt using the multiple languages in which the prompt has a level of difficulty based on proficiency of the user.

4. The method of claim 1, wherein generating the prompt comprises:

generating the prompt using the multiple languages in which the prompt has a level of difficulty based on a resource type for the resource.

5. The method of claim 1, wherein generating the prompt comprises:

generating the prompt using a number of the multiple languages selected based on how many people speak the multiple languages in a geographic region.

6. The method of claim 1, wherein generating the prompt comprises:

generating the prompt using a machine learning model system.

7. The method of claim 1 further comprising:

monitoring a digital engagement by the user;

identifying language interaction samples from the digital engagement; and automatically determining a language proficiency for the user for the multiple languages using the language interaction samples for the user.

8. The method of claim 1, further comprising:

determining a difficulty level for the puzzle based on:

a security level associated with the resource being accessed;

a number of languages to include in the puzzle; or a complexity of cross-linguistic relationships required to solve the puzzle and wherein generating the puzzle comprises generating the puzzle according to the determined difficulty level.

9. The method of claim 1, wherein identifying the set of language affinities further comprises:

querying at least one of:

a user profile database containing language proficiency data for the user;

a geographic location database identifying geographic regions associated with the user;

a communication history database storing prior communications in different languages by the user; or a social network database identifying language preferences indicated by the user.

10. The method of claim 1, wherein generating the puzzle comprises:

selecting a first portion of information to be encoded in a first language of the multiple languages;

selecting a second portion of information to be encoded in a second language of the multiple languages, wherein the second language is different from the first language;

encoding the first portion and the second portion such that comprehension of both the first language and the second language is required to derive a correct solution to the puzzle; and wherein the acceptable response demonstrates understanding of information from both the first portion and the second portion.

11. A computer system comprising:

a processor set;

a set of one or more computer-readable storage media; and program instructions, collectively stored in the set of one or more storage media to cause the processor set to perform operations comprising:

identifying a set of language affinities for multiple languages in response to receiving a request from a client device for a user to access a resource;

generating a prompt using the multiple languages, wherein the prompt is a puzzle using the multiple languages, and wherein the puzzle comprises information encoded in a number of the multiple languages;

determining an acceptable response to the prompt, wherein the acceptable response to the puzzle requires input in the number of the multiple languages;

sending the prompt to the client device for the user;

authenticating the user based on the set of language affinities for the multiple languages in response to receiving a response from the client device that matches the acceptable response; and authorizing access to the resource based on the authentication.

12. The computer system of claim 11, wherein the puzzle is a question using the multiple languages.

13. The computer system of claim 11, wherein generating the prompt comprises:

determining a proficiency of the user for the multiple languages in the set of language affinities; and generating the prompt using the multiple languages in which the prompt has a level of difficulty based on the proficiency of the user.

14. The computer system of claim 11, wherein generating the prompt comprises:

generating the prompt using the multiple languages in which the prompt has a level of difficulty based on a resource type for the resource.

15. The computer system of claim 11, wherein generating the prompt comprises:

generating the prompt using a number of the multiple languages selected based on how many people speak the multiple languages in a geographic region.

16. The computer system of claim 11, wherein generating the prompt comprises:

generating the prompt using a machine learning model system.

17. The computer system of claim 11, further comprising:

determining a difficulty level for the puzzle based on:

a security level associated with the resource being accessed;

a number of languages to include in the puzzle; or a complexity of cross-linguistic relationships required to solve the puzzle wherein generating the puzzle comprises generating the puzzle according to the determined difficulty level.

18. The computer system of claim 11, wherein identifying the set of language affinities further comprises:

querying at least one of:

a user profile database containing language proficiency data for the user;

a geographic location database identifying geographic regions associated with the user;

a communication history database storing prior communications in different languages by the user; or a social network database identifying language preferences indicated by the user.

19. The computer system of claim 11, wherein generating the puzzle further comprises:

selecting a first portion of information to be encoded in a first language of the multiple languages;

selecting a second portion of information to be encoded in a second language of the multiple languages, wherein the second language is different from the first language;

encoding the first portion and the second portion such that comprehension of both the first language and the second language is required to derive a correct solution to the puzzle; and wherein the acceptable response demonstrates understanding of information from both the first portion and the second portion.

20. A computer program product for accessing a resource, the computer program product comprising:

a set of one or more computer-readable storage media;

program instructions stored on the set of one or more storage media to perform operations comprising:

identifying a set of language affinities for multiple languages in response to receiving a request from a client device for a user to access the resource;

generating a prompt using the multiple languages, wherein the prompt is a puzzle using the multiple languages, and wherein the puzzle comprises information encoded in a number of the multiple languages;

determining an acceptable response to the prompt, wherein the acceptable response to the puzzle requires input in the number of the multiple languages;

sending the prompt to the client device for the user;

authenticating the user based on the set of language affinities for the multiple languages in response to receiving a response from the client device that matches the acceptable response; and authorizing access to the resource based on the authentication.

\* \* \* \* \*